United States Patent [19]

Arild

[11] 4,431,157
[45] Feb. 14, 1984

[54] PIVOTAL ADJUSTMENT MECHANISM
[76] Inventor: Tor Arild, P.O. Box 4063, Woodside, Calif. 94062
[21] Appl. No.: 322,558
[22] Filed: Nov. 18, 1981
[51] Int. Cl.³ .......................................... F16M 13/00
[52] U.S. Cl. .................................... 248/583; 248/608; 297/303
[58] Field of Search ............... 248/608, 583, 590; 297/302, 303, 304, 268

[56] References Cited
U.S. PATENT DOCUMENTS

| 2,338,090 | 1/1944 | Bradfield | 285/188 |
| 2,718,257 | 9/1955 | Lie | |
| 2,935,119 | 5/1960 | Lie | 297/303 X |
| 3,185,429 | 5/1965 | Meinhardt | 297/303 X |
| 3,188,071 | 6/1965 | Owen | |
| 3,360,255 | 12/1967 | Ormond | |
| 3,464,663 | 9/1969 | Blomborg | 297/303 X |
| 3,512,419 | 5/1970 | Stiles | |
| 3,592,433 | 7/1971 | Fuhrman | 248/608 X |
| 4,185,803 | 1/1980 | Kalvatn | |
| 4,235,408 | 11/1980 | Sapper | 297/302 X |

FOREIGN PATENT DOCUMENTS

| 2404139 | 5/1979 | France | 403/391 |
| 217011 | 6/1924 | United Kingdom | 297/303 |

Primary Examiner—J. Franklin Foss
Attorney, Agent, or Firm—Limbach, Limbach & Sutton

[57] ABSTRACT

A pivotal adjustment mechanism is disclosed for connection to two mutually movable members. More particularly, an adjustment mechanism is disclosed providing torsionally restricted motion in all axes. The composite structure includes a plurality of tubes and torsion bar components interconnected to transmit forces between the movable members. The torsional forces are transmitted through a circuitous path for maximizing restraint in a device of compact size.

7 Claims, 3 Drawing Figures

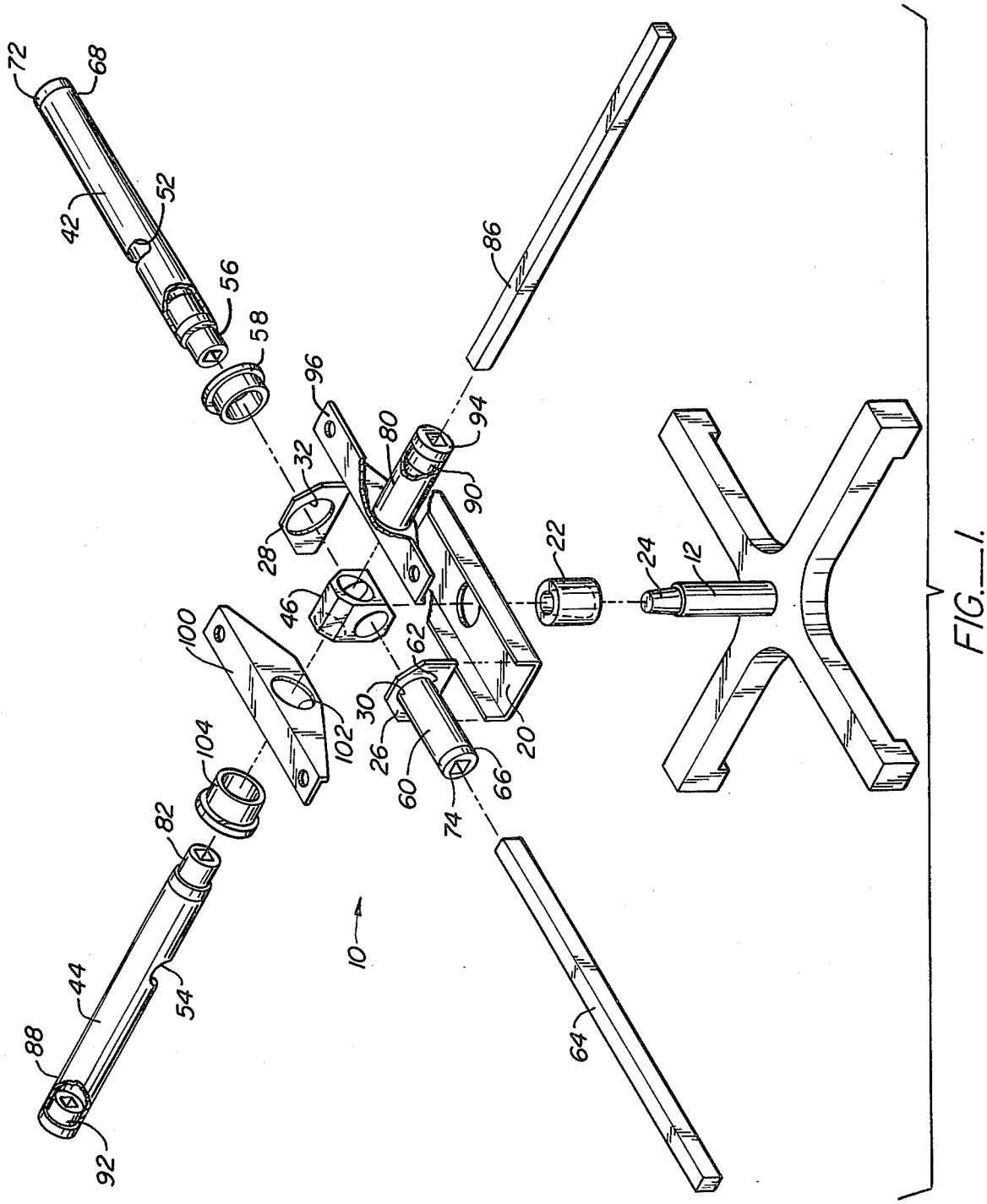
FIG._1.

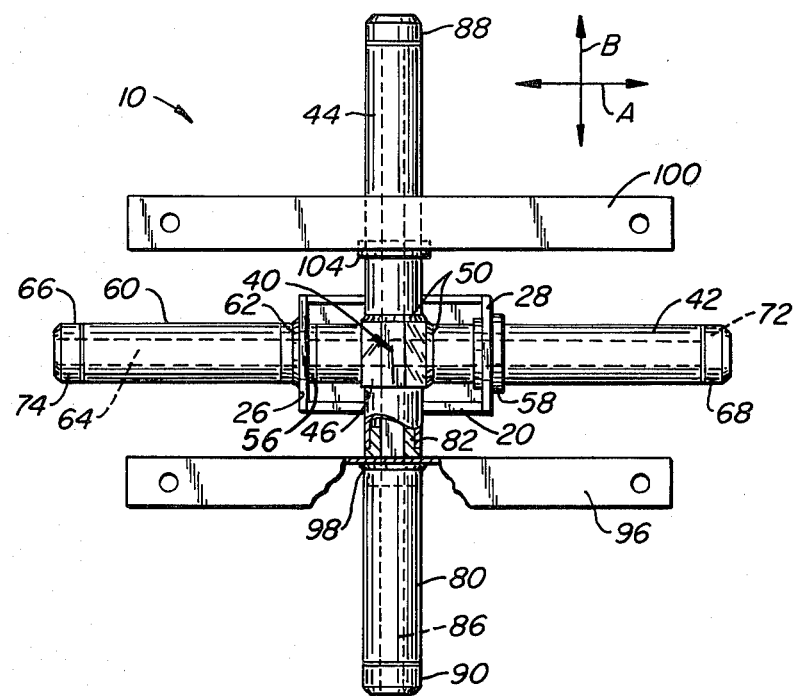
FIG._2.
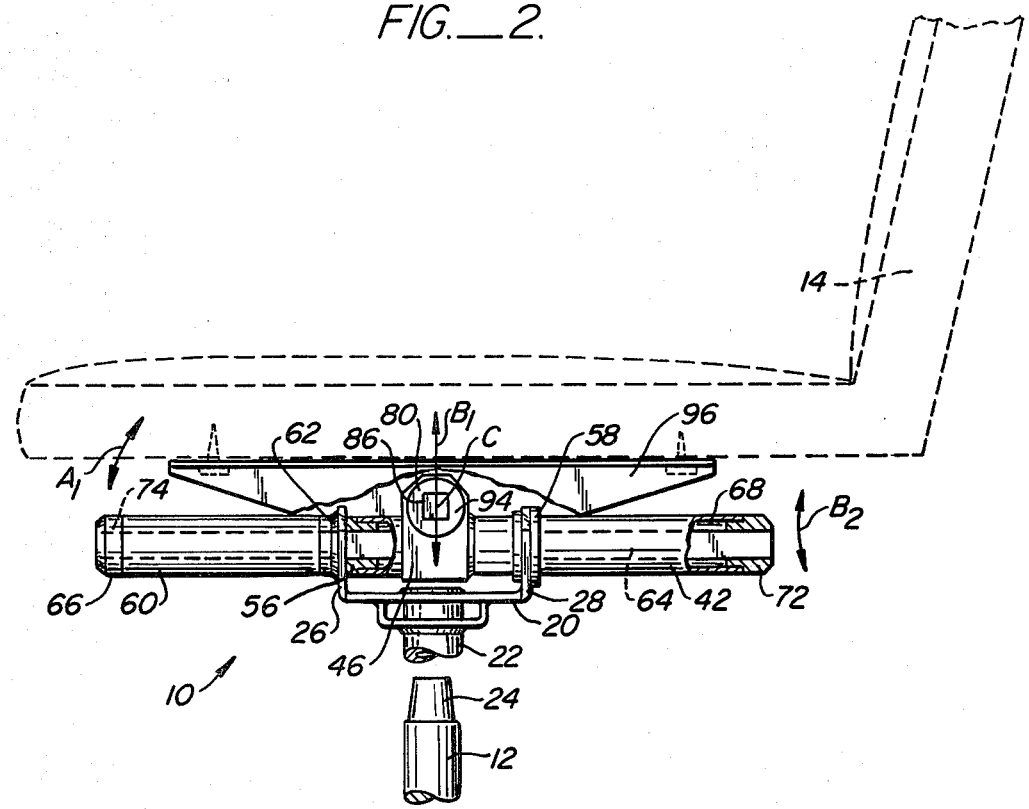
FIG._3.

PIVOTAL ADJUSTMENT MECHANISM

BACKGROUND OF THE INVENTION

The subject invention relates to a new and improved pivotal adjustment mechanism for the connection between two mutually movable members. More particularly, a pivotal adjustment mechanism is disclosed, particularly adapted to interconnect the seat and base portion of a chair.

In the prior art, a variety of adjustment mechanisms have been developed for use with chairs. Initially, adjustment mechanism for office type chairs were limited to tilt back devices which restrain the pivoting movement of the seat in the rearward direction in response to a user leaning backwards. More recently, there have been developed more sophisticated mechanisms which permit the user to lean in any axis, thereby providing greater support and comfort. These mechanisms also provide torsional restraint in all axes of movement. Such prior art devices are typically used in office type chairs. However, other applications are possible, such as in a boat, enabling a user to sit relatively quietly in place, during a swell, in a desired horizontal position, while the base of the chair shifts in heavy seas. Similarly, advantages are obtained in road vehicles when driving on uneven ground.

One example of a pivotal adjustment mechanism known in the prior art can be found in U.S. Pat. No. 4,185,803, issued Jan. 29, 1980, to Kalvatn. The mechanism in Kalvatn includes a pair of concentric rings which are interconnected, and having a pair of torsion bars individually connected to each ring. The device in Kalvatn is effective to torsionally restrain the movement of a chair in all axes of motion. However, the Kalvatn device requires relatively large diameter rings to achieve a high level of torsional restraint. Accordingly it would be desirable to provide a new and improved pivotal adjustment mechanism providing torsional restraint in all axes while being compact and having a low profile.

SUMMARY OF THE INVENTION

Accordingly, it is an object of the subject invention to provide a new and improved pivotal adjustment mechanism for connection between two mutually movable members.

It is another object of the subject invention to provide a new and improved pivotal adjustment mechanism which achieves torsional restraint in all axes of motion.

It is a further object of the subject invention to provide a new and improved pivotal adjustment mechanism which achieves high torsional restraint in a compact package having a low profile.

In accordance with these and many other objects, the subject invention provides a new and improved pivotal adjustment mechanism particularly adapted to interconnect the seat of a chair with a pedestal or base. More particularly, an adjustment mechanism is disclosed which includes a support means connected to the pedestal and having a pair of spaced apart aligned upstanding braces, each brace having an aperature formed therein. The adjustment mechanism further includes a tubular structure defined by first and second hollow tubes. The tubes are disposed at right angles, to define a cross-shaped configuration in plan, and are fixably secured at their intersection. The tubular structure is mounted on the support means with the intersection thereof being disposed between the upstanding braces in a manner such that the opposed ends of the first tube are rotatably received through the aligned aperatures of the braces.

A first tube segment is provided which extends outwardly away from one of the two braces in longitudinal alignment with the first tube. The first tube segment is fixably secured to the brace. In addition, the first tube segment is rotatably mounted with respect to the first tube. A first torsion bar is provided which extends longitudinally within the first tubes, with one end thereof being affixed to the free distal end of the first tube segment. The other end of the torsion bar is affixed to the remaining opposed end of the first tube.

A second tube segment is rotatably mounted to one end of the second tube, in longitudinal alignment therewith. A second torsion bar is provided which longitudinally extends within the second tubes. One end of the torsion bar is affixed to the free end of the second tube segment and the other end thereof is affixed to the remaining free end of the second tube.

The subject mechanism further includes a first bracket member fixably connected to the second tube segment and extending perpendicularly thereto. A second bracket member is rotatably mounted to the second tube adjacent the free end thereof, and parallel to the first bracket member. Both the bracket members may be fixably secured to the seat portion of the chair.

Any relative motion between the seat portion and the base is transmitted through the mechanism and restrained by the torsion bars. For example, motion having a force component causing a rotational torque to be placed on the first bracket member is transmitted along a path defined by the connection between the second tube segment, along the second torsion bar and through the second tube to the intersection of the tubular structure. Similarly, side to side swaying motions generate a force component which is transmitted through the intersection of the support members into the first tube, along the first torsion bar, through the first tube segment and to the support means. As can be appreciated, the long circuitous paths of force transmission enhances the torsional restraining capabilities of the subject mechanism and permits construction of an operable device in a package of reduced dimensions.

Further objects and advantages of the subject invention will become apparent from the following detailed description, taken in conjunction with the drawings in which:

BRIEF DESCRIPTION OF THE DRAWINGS

FIG. 1 is an exploded perspective view of the new and improved pivotal adjustment mechanism of the subject invention.

FIG. 2 is a top plan view of the new and improved pivotal adjustment mechanism of the subject invention.

FIG. 3 is a side elevational view of the new and improved pivotal adjustment mechanism of the subject invention.

DETAILED DESCRIPTION OF THE PREFERRED EMBODIMENT

Referring to FIGS. 1 through 3, there is illustrated the new and improved pivotal adjustment mechanism 10 of the subject invention. The adjustment mechanism 10 is intended to be connected between two members to permit movement therebetween in all directional axes. The subject mechanism is also tensioned to torsionally restrain extreme movements. The subject mechanism is particularly adapted for use with chairs. As illustrated in FIGS. 1 and 3, the mechanism 10 can be connected between a chair base 12 and a seat 14 (shown in phantom).

Mechanism 10 includes a support means defined by plate 20, which is connectable to the pedestal or base 12 of the chair. The connection can be made, for example, by using a tapered bushing 22 which is welded to the lower surface of support means 20. The bushing 22 is receivable over a conical tip 24 of the pedestal 12. Plate 20 is provided with a pair of spaced apart, aligned, upstanding braces 26 and 28. Each brace 26, 28 is provided with an aperature 30 and 32, respectively which are disposed in longitudinal alignment.

The subject mechanism further includes a tubular structure, shown generally at 40, which is defined by first and second hollow tubes 42 and 44, respectively. Tubes 42 and 44 are disposed at right angles to define a cross-shaped configuration in plan, as illustrated in FIG. 2. Tubes 42 and 44 are fixably connected at their intersection via clamp 46. Clamp 46 acts as a guide for supporting the members during assembly. Tubes 42, 44 are welded to clamp 46 along weld joints 50, as illustrated in FIG. 2.

In the preferred embodiment of the subject invention, tubes 42 and 44 are provided with complimentary, eliptical cutouts 52 and 54. In the assembled condition, cutouts 52 and 54 enable the tubes to be interlocked. The interlocking of the tubes reduces the profile height of the tube structure 40, as illustrated in FIG. 3, such that the mechanism 10 may be more readily mounted to the chair.

Tubular structure 40 is mounted to the support plate 20 with the center clamp 46 being disposed between the upstanding braces 26 and 28. In addition, and as illustrated in FIGS. 2 and 3, the opposed ends of the first tube are rotatably received in the aligned aperatures 30 and 32 of the braces. The rotatable mounting can be enhanced by utilizing a pair of bushings 56 and 58.

The subject mechanism 10 is further provided with a first tube segment 60 which extends outwardly from one brace 26, in longitudinal alignment with first tube 42. First tube segment 60 is fixably secured to brace 26 by weld joint 62. In the illustrated embodiment, the diameter of tube segment 60 is equal to the diameter of first tube 42. Accordingly, first tube 42 must terminate at rotatable bushing 56. In an alternative embodiment of the subject mechanism (not shown), first tube 42 is rotatably and telescopingly received within first tube segment 60. In the latter embodiment, the first tube segment is formed with a larger diameter than the first tube. In this configuration, the first tube will extend beyond brace 26, and be received within the first tube segment. While the latter construction enhances the torsional capabilities of the mechanism, fabrication of the device is facilitated by configuring the tubes with equal diameters, as in the illustrated embodiment.

A first torsion bar 64 is provided and extends longitudinally within the first tube 42 and first tube segment 60. One end of first torsion bar 64 is affixed to the free end 66 of the first tube segment 60. The opposed end of torsion bar 60 is affixed to the free end 68 of the first tube 42. To facilitate the interconnection of the torsion bar, a pair of plugs 72 and 74 can be welded into the ends of the first tube and first tube segment, respectively. When the torsion bar 64 is constructed with a square cross-sectional configuration, each plug 72, 74 is provided with a square aperature for fixably receiving the ends of the torsion bar.

The interconnections described above define a circuitous path for the transmission of forces generated by movement in one direction, between members 12 and 14. For example, and as described more fully hereinbelow, side to side shifting of the pedestal 12 is transmitted to the plate 20 and to the first tube segment 60 through the fixed connection between the segment and brace 26. Torsional forces generated by the shifting are transmitted outwardly along first tube segment 60 and transferred to the end of first torsion bar 64. The force is then transmitted along first torsion bar 64 and transferred to the opposed end 68 of first tube 42. Finally, the force is transmitted back along the first tube 42 to the center clamp 46. The shifting movement is torsionally restrained by all the elements along the path.

In accordance with the subject invention, a second tube segment 80 is rotatably mounted to one end of the second tube 44, in longitudinal alignment therewith. In the illustrated embodiment, the rotational connection is established utilizing a support bearing 82, as illustrated in FIG. 2. The support bearing 82 is utilized when the diameters of the second tube 44 and the second tube segment 80 are equal. In an alternative embodiment (not shown), the diameter of second tube segment 80 is enlarged such that the end of second tube 44 can be telescopingly and rotatably received therein. However, as discussed above, by providing tubes with equal diameters, fabrication of the device is facilitated.

A second torsion bar 86 is provided and longitudinally extends within second tube 44 and second tube segment 80. One end of torsion bar 86 is fixably connected to the free end 88 of the second tube 44. The opposed end of the torsion bar is fixably connected to the distal end 90 of the second tube segment. Similar to the interconnection of the first torsion bar, a pair of plugs 92 and 94 may be welded within the respective tubes to facilitate the fixed connection.

A first bracket member 96 is fixably connected to the second tube segment 80 and extends perpendicularly thereto. Bracket 96 may be formed integrally with the second tube segment or welded thereto as illustrated at 98 in FIG. 2. A second bracket 100 is rotatably mounted around second tube 44, in parallel relationship to the first bracket 96. Bracket 100 is provided with an aperature 102 for receiving a bearing 104 to facilitate rotation. Brackets 96 and 100 are intended to be fixably secured to the second movable member 14.

The latter described construction defines a second circuitous force path for transmitting forces generated by movement between the members 12, 14 in a second direction. As described more fully below, front to back shifting of bracket 96 is transmitted to second tube segment 90 and along torsion bar 96. These forces are then transmitted to second tube 44 and into clamp 46. Similar to the first path, the shifting movement is torsionally restrained by all the elements in the path.

As discussed above, the subject mechanism 10 is particularly adapted for use with a chair in environments where tilting will occur between the seat 14 and the base 12. For example, in an office situation, a user will lean in various directions in the chair, causing the seat to tilt relative to the base. As can be appreciated, relative movement about a pivotal joint can be broken down into a composite of two directional vector components, extending perpendicularly to one another, as indicated by the Arrows A and B in FIGS. 2 and 3. Accordingly, the torsional restraining features of the subject mechanism 10 can be explained with reference to these two perpendicular axes. It is to be understood however, that any tilting force at an angle not aligned with the perpendicular force arrows is merely a composite of the two motions.

Accordingly, if the user in the seat leans in either a forward or backward direction, rotatable second bracket 100 will move freely with respect to the mechanism 10, in a direction indicated by arrows $A_1$ in FIG. 3. In contrast, the tilting motion in this direction will be imparted as a rotational torque to the second tube segment 80 through fixably connected first bracket 96. As described above, the rotational torque will be transmitted from the end 90 of second tube segment 80 into the torsion bar 86. The forces are then transferred from torsion bar 86 to second tube 44 and into the center clamp 146. Because the tubular structure 40 is mounted in the braces 26 and 28 of plate 20, forces initially imparted to bracket 96, in the direction of Arrows $A_1$, are then transmitted to base 12. Accordingly, any movement in the direction of Arrows $A_1$ is torsionally restrained by the combination of torsion bar 86, second tube 44 and second tube segment 80. The amount of torsional restraint can of course be regulated by adjusting the length and stiffness of the components.

Movement of seat 14 in a side to side direction, relative to base 12, will cause the ends C of second tube and second tube segment to move either up or down as indicated by Arrows $B_1$ in FIG. 3. Since the tubes 42, 44 are fixedly connected to each other and first tube 42 is rotatably mounted in braces 26 and 28 of plate 20, movement in this direction will result in the rotation of first tube 42, in the direction of Arrows $B_2$, in FIG. 3. This rotational movement is transmitted to the end 68 of first tube 42 and transferred to torsion bar 64. Torsion bar 64 transmits the force to the first tube segment 60 where the force is transferred to brace 26 via the fixed connection between the latter elements. Rotational forces on brace 26 are imparted to plate 20 and into pedestal 12 of the chair. Thus, movement in the side to side direction is torsionally restrained by a combination of the first tube 42, torsion bar 64 and first tube segment 60. As stated above, any tilting in a intermediate direction will be torsionally restricted in both axes in accordance with the distribution of the component force vectors. As can be appreciated, when the subject mechanism 10 is used in a situation such as a boat, where the base shifts, the forces are transmitted through identical paths in the reverse order.

In summary, there is provided a new and improved pivotal adjustment mechanism 10 for use with movable members. More particularly, an adjustment mechanism is disclosed having a support means 20 fixably connected to one of the two mutually movable members. Support means 20 includes a pair of spaced apart, aligned, upstanding braces 26 and 28, each brace having an aperature therein. The adjustment mechanism further includes a tubular structure 40 defined by first and second hollow tubes 42 and 44, respectively. The hollow tubes are disposed at right angles to define a cross-shaped configuration in plan and are fixably secured at their intersection. Tubular structure 40 is mounted on support means 20, with the intersection thereof being disposed between the upstanding braces and with the opposed ends of the first tube 42 being rotatably received through the aligned aperatures in the braces. A first tube segment 60 extends outwardly away from one brace 26, in longitudinal alignment with the first tube and is fixably secured to the brace. The first tube is rotatably mounted with respect to the first tube segment. A first torsion bar 64 extends longitudinally within the first tube and first tube segment with one end thereof being affixed to the free end of the first tube segment and with the other end being affixed to the remaining opposed end of the first tube. A second tube segment 80 is rotatably mounted to one end of the second tube 44, in longitudinal alignment therewith. A second torsion bar 86 longitudinally extends within the second tube and second tube segment. One end of torsion bar 86 is affixed to the remaining free end of the second tube while the opposed end of the torsion bar 86 is connected to the distal end of the second tube segment. A first bracket member 96 is fixably connected to the second tube segment 80 and extends perpendicularly thereto. A second bracket member 100 is rotatably mounted to the second tube, adjacent the free end thereof, in parallel relation to the first bracket member. The first and second bracket members are fixably connected to the remaining movable member. By this arrangement, relative motion between the movable members is transmitted through the mechanism and is torsionally restrained by the component parts.

While the subject invention has been described with reference to a preferred embodiment, it is to be understood that various modifications and changes could be made therein, by one skilled in the art, without varying from the scope and spirit of the subject invention as defined by the appended claims. For example, and as discussed above, first and second tubes 42 and 44 may be configured to be telescopingly and rotatably received within the associated tube segments.

What is claimed is:

1. A pivotal adjustment mechanism for a pair of mutually movable members, said mechanism comprising:

a first support means fixably connected to one of the two mutually movable members, with the support means having a pair of spaced apart, aligned upstanding braces, each brace having an aperature therein;

a tubular structure defined by first and second hollow tubes disposed at right angles to define a cross-shaped configuration in plan and fixably secured at their intersection, with the tubular structure being mounted on said support means with the intersection thereof being disposed between the upstanding braces and with the opposed ends of the first tube being rotatably received through the aligned aperatures of the braces;

a first tube segment extending outwardly away from one brace in longitudinal alignment with the first tube and fixedly secured to said one brace, said first tube being rotatably mounted with respect to the first tube segment;

a first torsion bar extending longitudinally within the first tube and first tube segment, with one end thereof being affixed to the free end of the first tube segment and with the other end being affixed to the remaining opposed end of the first tube;

a second tube segment rotatably mounted to one end of the second tube and in longitudinal alignment therewith;

a second torsion bar longitudinally extending within the second tube and second tube segment, with one end thereof being affixed to the outer distal end of the second tube segment and with the other end thereof being affixed to the remaining free end of the second tube; and a second support means fixedly secured to the remaining movable member, said second support means including a pair of spaced apart, downwardly projecting bracket members, with one bracket member being fixedly mounted to said second tube segment and with the other bracket member being rotatably mounted to the second tube adjacent the free end thereof whereby relative motion between the movable members is transmitted through the mechanism and restrained by the torsion bars.

2. A pivotal adjustment mechanism as recited in claim 1 wherein said first and second tubes are provided with complimentary elipitical cut-outs, said tubes being inter-engaged at said aperatures cut-outs thereby reducing the profile height of said tubular structure.

3. A pivotal adjustment mechanism as recited in claim 1 wherein the end of the first tube, connected to the first tube segment, terminates adjacent said one brace of said support means, with said rotatable connection between said first tube and first tube segment including a bearing means.

4. A pivotal adjustment mechanism as recited in claims 1 or 3 wherein the rotatable connection between the second tube and the second tube segment includes a rotatable bearing means.

5. A pivotal adjustment mechanism as recited in claim 1 further including a first pair of plug means fixably secured to the free ends of the first tube and first tube segment respectively, with the ends of said first torsion bar being secured to the plugs.

6. A pivotal adjustment mechanism as recited in claim 1 further including a second pair of plug means fixably secured to the free ends of the second tube and second tube segment respectively, with the ends of said second torsion bar being secured to the plugs.

7. A pivotal adjustment mechanism as recited in claims 5 or 6 wherein the torsion bars have a generally square cross-section and wherein each of said plug means includes a generally square aperature for securely receiving the ends of the respective torsion bar.

* * * * *

UNITED STATES PATENT AND TRADEMARK OFFICE
CERTIFICATE OF CORRECTION

PATENT NO. : 4,431,157
DATED : Feb. 14, 1984
INVENTOR(S) : Tor Arild

It is certified that error appears in the above—identified patent and that said Letters Patent is hereby corrected as shown below:

Claim 2, line 4, delete "aperatures".

*Signed and Sealed this*

*Twenty-fifth* Day of *February 1986*

[SEAL]

*Attest:*

DONALD J. QUIGG

*Attesting Officer*     *Commissioner of Patents and Trademarks*